A. SUNDH.
POWER TRANSMITTING MECHANISM.
APPLICATION FILED MAR. 21, 1914.
1,228,145.
Patented May 29, 1917.
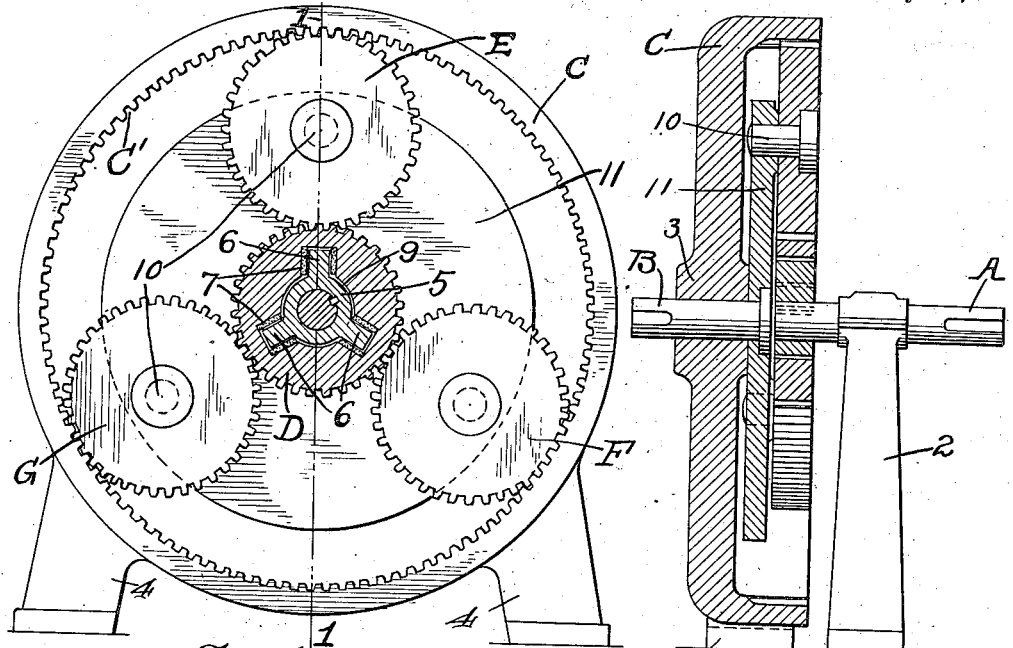
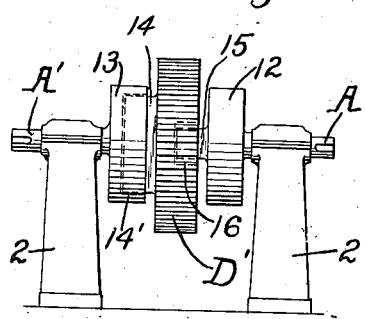
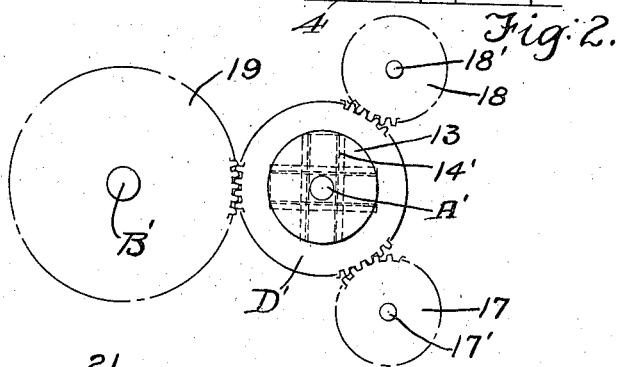
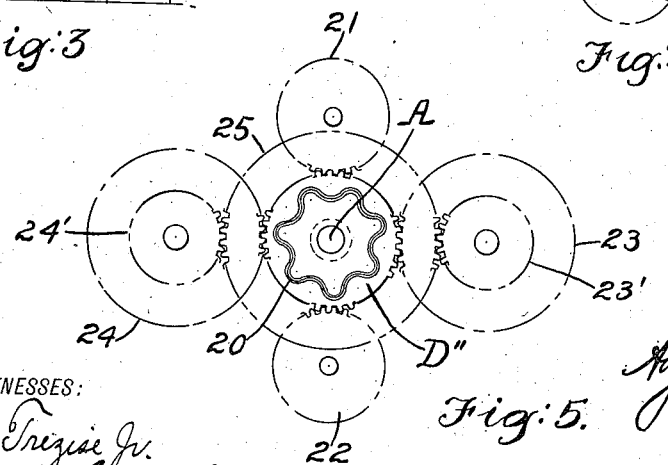
WITNESSES:
Arthur Trezise Jr.
James G. Bothell
August Sundh
INVENTOR
BY
S. H. Campbell
ATTORNEY

UNITED STATES PATENT OFFICE.

AUGUST SUNDH, OF HASTINGS-UPON-HUDSON, NEW YORK, ASSIGNOR TO OTIS ELEVATOR COMPANY, A CORPORATION OF NEW JERSEY.

POWER-TRANSMITTING MECHANISM.

1,228,145.  Specification of Letters Patent.  Patented May 29, 1917.

Application filed March 21, 1914. Serial No. 826,167.

*To all whom it may concern:*

Be it known that I, AUGUST SUNDH, a citizen of the United States, residing in Hastings-upon-Hudson, in the county of Westchester and State of New York, have invented a new and useful Improvement in Power-Transmitting Mechanism, of which the following is a specification.

My invention relates to power transmitting apparatus comprising spur gearing, and the object thereof is to provide a yielding connection between a driving shaft and driving pinion, and to associate with the latter a novel system of gearing for transmitting power from the driving shaft to a driven shaft, the arrangement being such that the driving pinion is kept in proper adjustment with the power transmitting gears, independently of the driving shaft.

Other objects of the invention will appear more fully hereinafter, the novel combinations and arrangements of parts being pointed out in the appended claims.

In the accompanying drawings which illustrate constructions embodying my invention, Figure 1 is a front view of an apparatus arranged in accordance with the present invention; Fig. 2 is a sectional view of Fig. 1 taken on the line 1—1; Figs. 3, 4 and 5, show the application of my invention in various modified forms.

The power transmitting gearing shown in Figs. 1 and 2 comprises a shaft A, which may be termed the driving shaft, said shaft being suitably journaled in a standard bearing 2. The shaft B which may likewise be termed the driven shaft, is supported in a bearing 3 formed in a stationary annular ring C, which is suitably supported by standards 4 formed integrally therewith. Intermediate gearing, comprising spur gears, etc., forms a driving connection between the shafts A and B, so that when the shaft A is driven at a high speed, the motion will be transmitted to the shaft B, and operate the latter at a reduced speed. The shaft A is adapted to be connected to any suitable source of power, such as for example, an electric motor or a gas engine, and the shaft B may be connected to operate any desired mechanism.

A driving pinion D is yieldingly connected to the drive shaft A, said connection comprising a spider 5, which may be keyed or otherwise suitably fixed to the driving shaft A. The spider 5 consists of lugs 6, which fit into corresponding openings 7 in the pinion D. The faces of the openings 7 which oppose the faces of the lugs 6, are lined with members 8, which may be of any suitable yielding material, such as for example, leather or rubber or thin sheet steel. It will be noted that the very small spaces 9 permit a small relative movement of the pinion D. In order now to transmit power from the driving shaft A to the driven shaft B, I provide a novel system of gearing arranged as follows: Spur gears E, F and G are supported by pins 10 on an annular plate 11, which is fixed to the driven shaft B. The spur gears are radially disposed 120° apart on the plate 11, and mesh with the driving pinion D. These gears also mesh with a gear C' formed on the inner periphery of the ring C.

The operation is as follows: The rotation of the driving shaft A imparts movement through the yielding connection to the driving pinion D which acts as a positive driving means to rotate the gears E, F and G, thereby causing the same to travel around the annular gear C'. The gears E, F and G carry with them the plate 11, thereby rotating the driven shaft B at a greatly reduced speed to that of the driving shaft A.

It will now be seen that the yielding connection thus provided permits a movement of the pinion D relative to the driving shaft A, and furthermore the spur gears E, F and G keep the pinion D in proper adjustment or in alinement therewith, independently of the driving shaft A.

In the modification shown in Figs. 3 and 4, the driving pinion D', drives the driven shaft B' directly.

With this arrangement the pinion D' is yieldingly connected with the members A and A' which comprise the driving shaft, said connection comprising members 12 and 13 which are fixed to the shafts A and A', respectively. The pinion D' is positively connected with said members by means of lugs 14 and 15 formed integrally with the pinion D' and member 12, respectively, these lugs fitting loosely into slots 14' and 16 in the member 13 and pinion D' respectively. The faces of the slots 14' and 16 which oppose the faces of the lugs 14 and 15, respectively, are lined with yielding material as in the former case. Gears 17, 18 and 19 mesh with the gear D', the gears 17 and 18 serving as idlers. The gear 19 rotates the driven shaft B', and may be of any diameter to obtain a reduction in speed desired between the driving shaft A and the driven shaft. The gears 17 and 18 in this instance serve simply as idlers, and together with the gear 19 serve to float the pinion D' therebetween, thereby keeping the latter in proper adjustment therewith, independently of the driving shaft A.

In the modification shown in Fig. 5, the hub of the driving gear D'' is corrugated or waved and a strip 20 of spring steel or other suitable material is interposed in one or more layers between said parts. This forms an elastic or self adjusting connection between the hub and pinion D''. The specific construction and operation of this connection are disclosed in my Patent, No. 1,017,819, granted February 20, 1912. Gears 21 and 22 mesh with the driving pinion D'', and serve only as idlers, while gears 23 and 24 which carry on their shafts the gears 23' and 24', respectively, transmit power from the driving pinion D'' to a gear 25 which meshes with the gears 23' and 24'. The gear 25 in this instance is carried by the driven shaft B, and the latter it will be seen will operate at a reduced speed from that of the driving shaft A. The pinion D'' being yieldable is kept in alinement or in proper adjustment with the power transmitting gears by the latter together with the idlers 21 and 22, and independently of the driving shaft A.

It is obvious that various other modifications might be made by those skilled in the art without departing from the spirit and scope of my invention, I wish therefore not to be limited to the particular arrangement and combinations as herein disclosed.

What I claim as new and desire to secure by Letters Patent of the United States is:—

1. The combination of a driving shaft, a driven shaft, and reduction gearing for transmitting power from the driving shaft to the driven shaft, said gearing being arranged to aline part of the reduction gearing with the driving shaft and independently thereof.

2. The combination of a driving shaft, a driven shaft, a yieldable pinion carried by the driving shaft, and means for transmitting power from the pinion to the driven shaft, said means being arranged to aline the pinion with the driving shaft and independently thereof.

3. The combination of a driving shaft, a driven shaft, a yieldable pinion carried by the driving shaft, and gearing for transmitting power from said pinion to the driven shaft, said gearing being arranged to aline said pinion with the driving shaft and independently thereof.

4. The combination of a driving shaft, a driven shaft, a yieldable pinion carried by the driving shaft, and reduction gearing for transmitting power from the pinion to the driven shaft, said gearing being arranged to float said pinion and cause the latter to aline itself with the driving shaft independently thereof.

5. The combination of a driving shaft, a driven shaft, a yieldable pinion carried by the driving shaft, spur gears meshing with said pinion and arranged to aline the same with the driving shaft and independently thereof, and a driving connection between said spur gears and the driven shaft.

6. The combination of a driving shaft, a driven shaft, a yieldable pinion carried by the driving shaft, spur gears meshing with said pinion and arranged to aline the same with the driving shaft and independently thereof, and a driving connection between the spur gears and the driven shaft for rotating the same at a reduced speed from that of the driving shaft.

7. The combination of a driving shaft, a driven shaft, a yieldable pinion carried by the driving shaft, and planetary spur gearing between said pinion and the driven shaft, said gearing being arranged to cause said pinion to aline itself with the drive shaft and independently thereof.

In testimony whereof, I have signed my name to this specification in the presence of two subscribing witnesses.

AUGUST SUNDH.

Witnesses:
WALTER C. STRANG,
JAMES G. BETHELL.